United States Patent [19]

Price et al.

[11] 4,396,529

[45] Aug. 2, 1983

[54] METHOD AND APPARATUS FOR PRODUCING A FOAM FROM A VISCOUS LIQUID

[75] Inventors: Richard P. Price, Parma Hts., Ohio; Charles H. Scholl, Duluth, Ga.

[73] Assignee: Nordson Corporation, Amherst, Ohio

[21] Appl. No.: 193,722

[22] Filed: Oct. 3, 1980

Related U.S. Application Data

[63] Continuation-in-part of Ser. No. 959,608, Nov. 13, 1978, abandoned.

[51] Int. Cl.³ .......................... B01J 13/00; B01J 3/04
[52] U.S. Cl. .................................. 252/307; 118/300; 118/146 R; 118/359 E; 118/DIG. 26; 118/207.1; 118/244
[58] Field of Search .......................... 252/307, 359 E; 261/DIG. 26; 222/146 H, 146 HE; 427/207.1, 244; 118/300

[56] References Cited

U.S. PATENT DOCUMENTS

| | | |
|---|---|---|
| Re. 29,665 | 6/1978 | Gusmer et al. .................. 239/112 |
| 2,890,868 | 6/1959 | Potchen ........................... 366/336 |
| 3,151,427 | 10/1964 | Meissner et al. ................. 53/449 |
| 3,236,419 | 2/1966 | De Remer et al. ............ 252/359 E |
| 3,361,412 | 1/1968 | Cole ................................ 366/268 |
| 3,543,695 | 12/1970 | Rubenstein ...................... 261/27 |
| 3,716,190 | 2/1973 | Lindlof ............................ 239/25 |
| 3,734,406 | 5/1973 | Rundstadler, Jr. et al. . |
| 3,764,069 | 10/1973 | Runstadler, Jr. et al. .......... 239/8 |
| 3,765,448 | 10/1973 | Dussia ............................. 137/553 |
| 3,941,355 | 3/1976 | Simpson ......................... 366/99 |
| 4,006,845 | 2/1977 | Scholl et al. .................. 222/146 HE |
| 4,059,466 | 11/1977 | Scholl et al. ...................... 156/78 |
| 4,059,714 | 11/1977 | Scholl et al. .................... 428/310 |
| 4,135,882 | 1/1979 | Harkness et al. ............ 252/359 E X |
| 4,156,754 | 5/1979 | Cobbs, Jr. et al. ......... 222/146 HE X |

FOREIGN PATENT DOCUMENTS

| | | |
|---|---|---|
| 1262468 | 2/1972 | United Kingdom . |
| 1418772 | 12/1975 | United Kingdom . |
| 1424161 | 2/1976 | United Kingdom . |
| 1441658 | 7/1976 | United Kingdom . |

Primary Examiner—Richard D. Lovering
Attorney, Agent, or Firm—Wood, Herron & Evans

[57] ABSTRACT

A method and apparatus for producing a coherent or extruded output stream of viscous liquid containing a dispersed gas to form a foam. The liquid is pressurized and delivered to apparatus having an internal chamber which presents a flow space for the flow of the liquid through it as an integral stream. A gas is introduced under pressure into the liquid, through an opening to the chamber across which the liquid sweeps, to form an unstable mixture of the gas in the liquid. The gas and liquid mixture is not further pressurized by pumping once the gas and liquid have been contacted, but the unstable mixture is maintained under pressure while it flows from the chamber to a restricted outlet orifice which can be closely adjacent to the chamber. At the outlet the pressure of the gas and liquid mixture is suddenly reduced by forcibly ejecting the mixture through the restricted orifice. A coherent stream of the gas/liquid mixture is produced wherein the gas substantially expands to form a foam.

30 Claims, 11 Drawing Figures

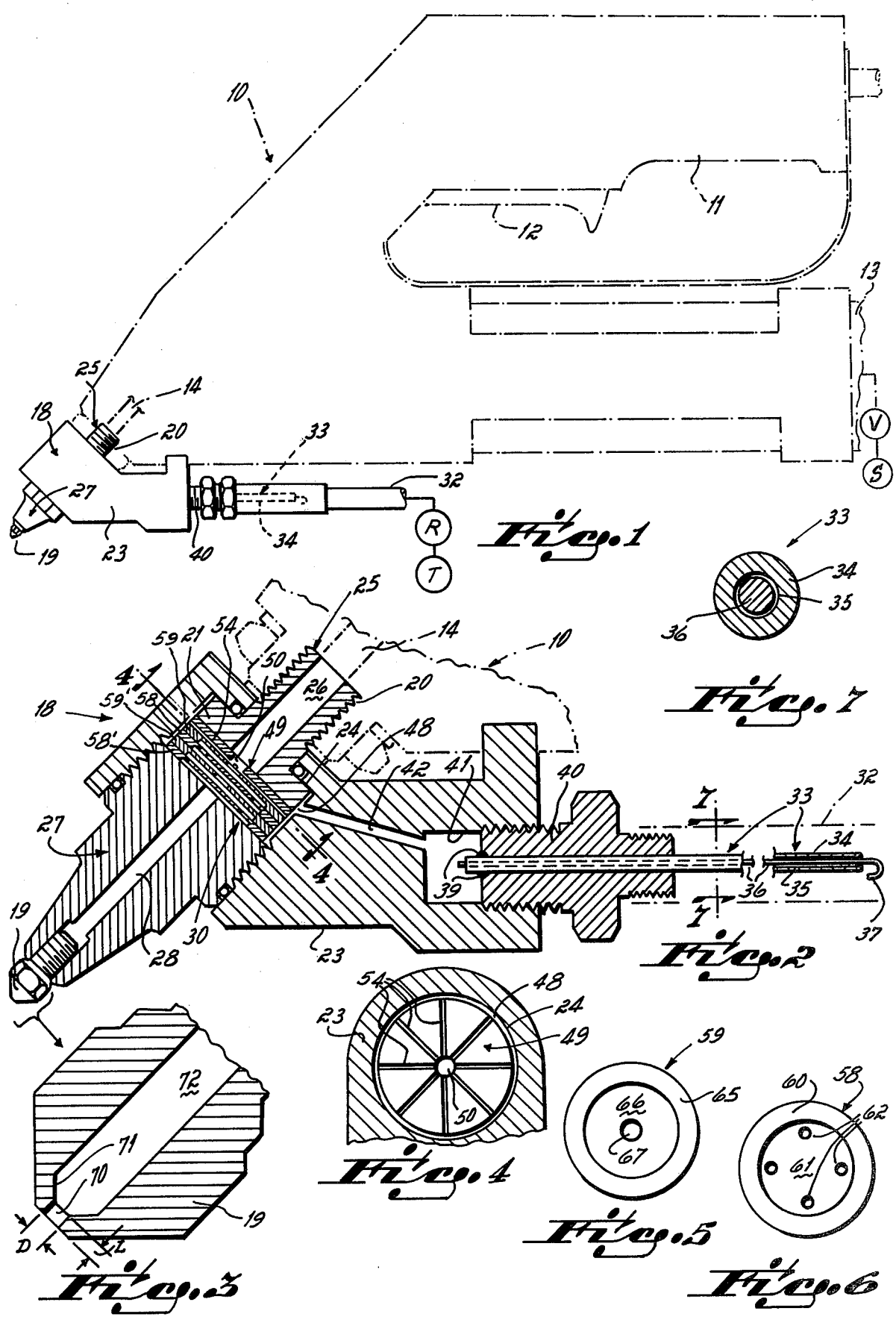

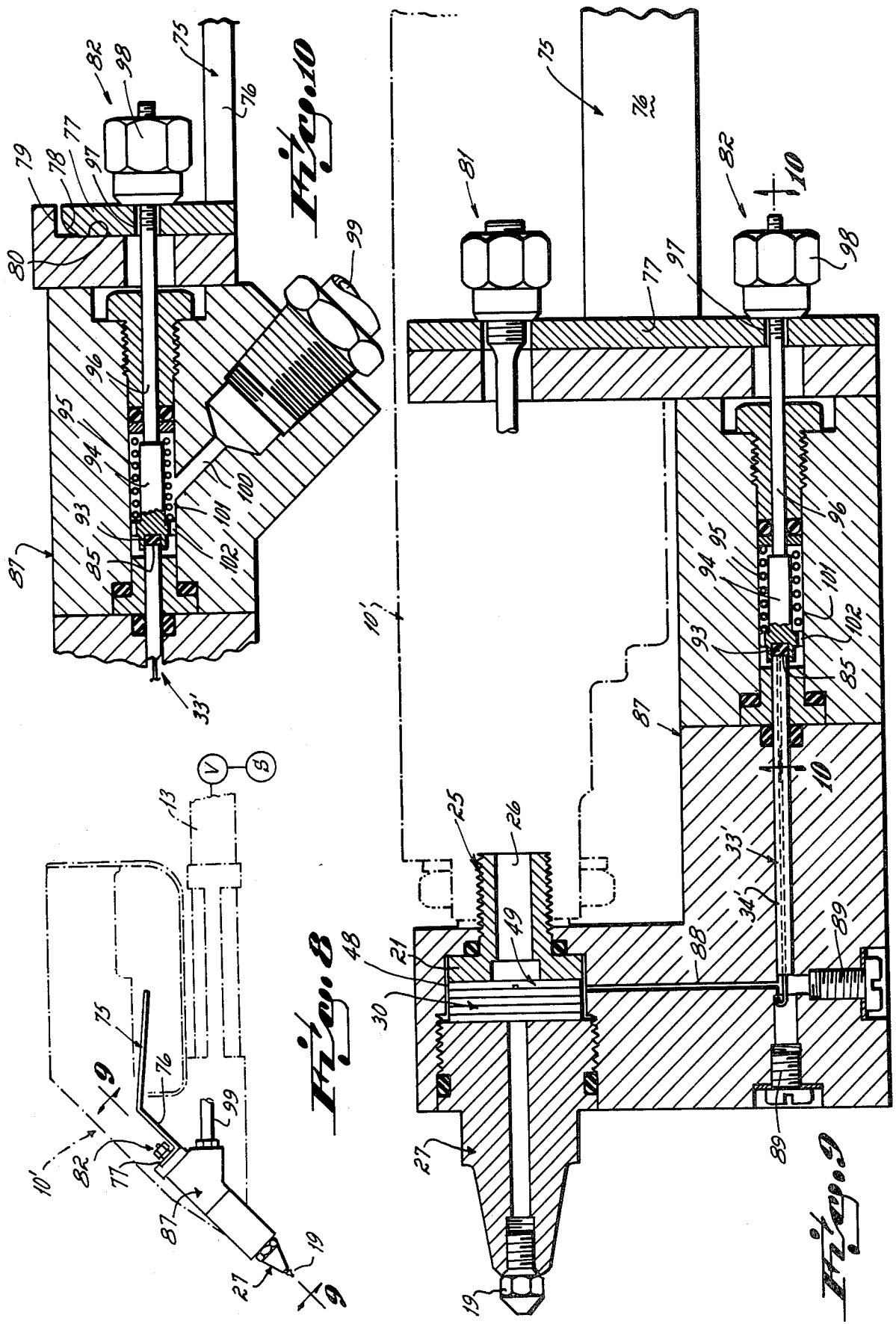

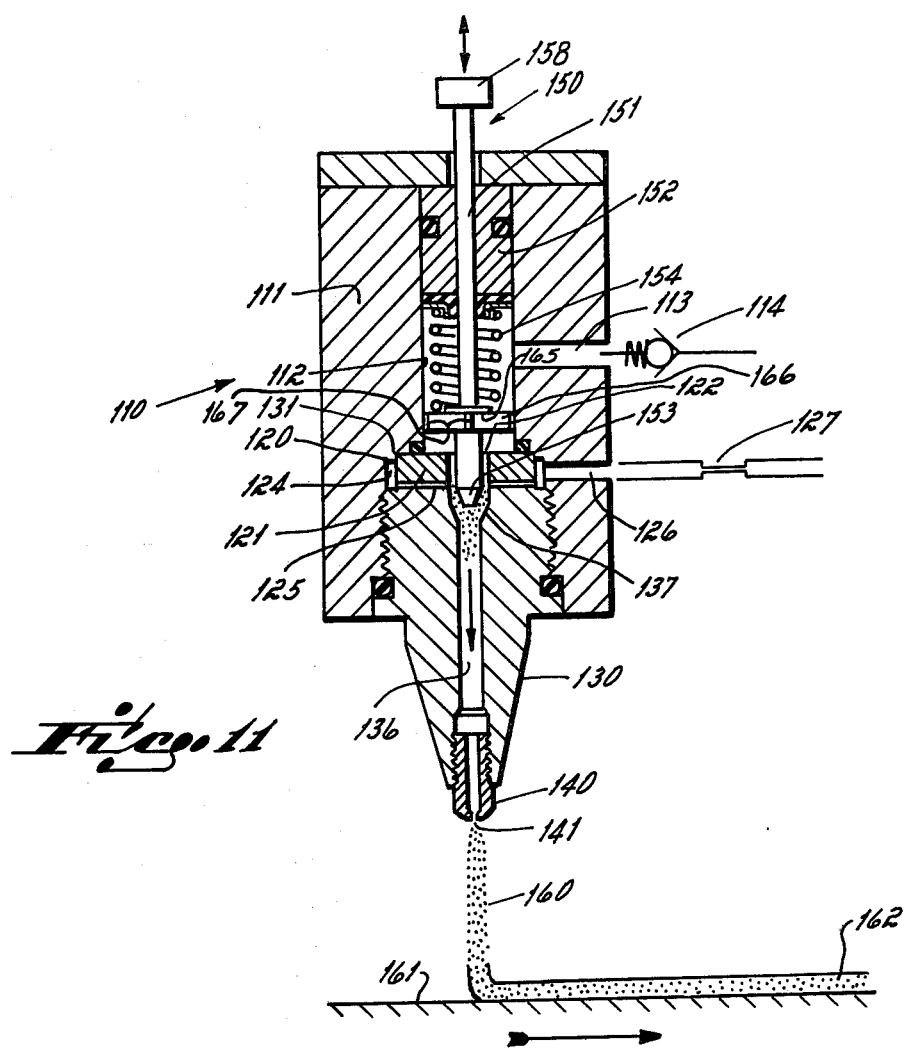

METHOD AND APPARATUS FOR PRODUCING A FOAM FROM A VISCOUS LIQUID

RELATED APPLICATION

This application is a continuation-in-part of co-pending application Ser. No. 959,608, filed Nov. 13, 1978, now abandoned.

FIELD OF THE INVENTION

This invention is directed to the production of foams of viscous liquids for application onto substrates. More particularly, it is directed to a method and apparatus for making a coherent stream of foam-forming liquid, wherein a gas is dispersed in the liquid in a chamber that can be just upstream of the nozzle of an applicator or gun, and without moving parts for achieving the dispersion. Among other applications, the invention is particularly useful for producing foams of liquid adhesives, including hot melt glues.

BACKGROUND OF THE INVENTION

The production of hot melt liquid adhesive foams is disclosed in Scholl et al U.S. Pat. Nos. 4,059,466 and 4,059,714, both issued on Nov. 22, 1977, and assigned to the same assignee as this application. Such foamed liquid adhesives present several advantages over non-foam adhesives. For example, after deposition a foamed liquid adhesive displays a longer "open" time period during which it remains sufficiently fluid to be receptive for adhering a substrate to it. Further, a foamed liquid adhesive displays better adhesive strength per unit weight, and thus reduces the quantity of adhesive required for a given bond.

Apparatus for producing such foams is known in the art. The Scholl et al patents cited above disclose gear pumps for this purpose. In such pumps, the liquid flow is "segmented," as discrete volumes, in the intertooth spaces of the gears. The foam-forming gas (usually air or an inert gas such as carbon dioxide, nitrogen or the like) is dispersed and apparently dissolved in the molten hot melt adhesive by the action of the meshing gear teeth increasing pressure on the segmented portions of the fluids. It will be appreciated that such gear pumps (and associated driving motors) are relatively bulky and require precision moving parts. For mix-in-gun use, the pump must be positioned at the gun or pont of dispensing.

THE PROBLEM IN THE ART

The weight and size of a motor driven pump can be a disadvantage and a limitation, as for example where the mixer is to be located right at the nozzle or dispensing apparatus from which the adhesive is to be discharged. The problem is especially acute if such a mixer is to be provided in a hand-held gun, because of the factors just noted.

Use of a pump for mixing can present a problem even where the pump is not at the gun and delivers the foam adhesive to the nozzle through a long hose. If the adhesive is dispensed discontinuously with intermittent periods of inaction, for example overnight, during such quiescent periods the gas/liquid mixture in the hose may tend to separate and, when later dispensed, the separated gas may cause nonuniform delivery from the gun. Where this is a concern, the problem could of course be overcome by the provision of a return line, but that would require another length of heated hose.

In other instances, where the gas reacts with the liquid adhesive after mixing, it may be desirable to bring the components together just upsteam of the dispensing nozzle, so that the reaction cannot progress to an undesirable extent during the short period of travel to the nozzle.

As yet another example, where foams of different densities or different gas/liquid ratios are to be supplied to separate nozzles, it is necesssary to provide separate mixers (either adjacent a supply, or adjacent each nozzle) for accomplishing the separate mixings. The apparatus previously available may be undesirably expensive for some applications requiring several mixers.

Against this background, it has been the primary objective of this invention to provide a less bulky, simpler, no-moving part apparatus for mixing gas into a viscous liquid, which can be mounted directly adjacent the output nozzle and which is suitable for incorporation in an adhesive dispenser. It has been a further objective to provide apparatus which can be mounted as a "kit," or add-on attachment to an existing applicator, to adapt it to supply the liquid foam.

In the co-pending application of Scholl and Akers, Ser. No. 914,159, filed June 9, 1978, now U.S. Pat. No. 4,264,214, entitled "Geaar Motor/Mixer," there is disclosed another type of mixing means for producing liquid foams, which can be used directly adjacent the nozzle of a dispenser. That application teaches a gear motor (as distinguished from a pump) which does not require an external mover to drive the gears and in which intermeshing gears are caused to rotate and establish mixing by the pressure of the fluids themselves.

The present invention provides a still lighter, simpler type of mixing device which involves no moving parts at all, excepting valve elements for controlling flow. It is less expensive to produce, light in weight and can be mounted directly adjacent the nozzles of present hand-held guns to adapt them for generating foam.

The method and apparatus of this invention are useful with viscous liquids generally, including but not limited to liquid adhesives. Examples of some viscous liquid with which the invention is especially useful includes hot melt adhesives, "cold" or non-hot melt liquid starch base adhesives including the "dextrin" glues, resin glues such as polyvinyl acetate, natural resins, hide or animal glues, thermoplastic resins, plastisols, and the like. As used herein, the term "viscous liquid" is meant generally to refer to and include liquids having viscosities substantially greater than that of water, for example, greater than about 100 centipoises. The liquids with which this invention is useful have viscosities above this value. On the other hand, thin materials such as water and the common solvents do not form stable, coherent foam streams by the technique of this invention, but rather are atomized as sprays.

In many adhesive bonding applications it is desirable to deposit the adhesive on the substrate in the form of a well defined line or bead, for example of the order of ⅛-½ inch wide. Such deposition is common in cartoning, in closure formation, and in other applications where the adhesive is applied to one substrate which is then brought into contact with a second substrate to form a closure and/or seal between them.

In such applications it is desirable, and in some situations even requisite, that the adhesive be discharged from the applicator or gun as a coherent (non-diverging) stream, to enable a well-defined line to be laid down.

While this can readily be achieved with unfoamed liquids, the problem is much more difficult where the liquid is to be applied as a foam. Spraying, spitting, coughing or cobwebbing can be serious problems in depositing foam beads.

In adhesive foam bead deposition, "spraying" is undesirable because it creates airborne adhesive "dust" and projects the material onto unwanted areas. "Spitting" is a more random or irregular projection of droplets which results in an indistinct or rough edge of the deposited bead. "Coughing" is a sudden interruption in the output stream that is believed to result from the emission of a large gas bubble or pocket through the nozzle; the bubble pops or expands rapidly on emission from the nozzle, disrupting the continuity of the adhesive laydown and resulting in a material gap at which there is an inadequate bond or seal. "Cobwebbing" is the generation of fine floating filaments of adhesive material from the nozzle, which are a form of dust that is an especial nuisance. Thus, an important objective of this invention has been to produce an output stream which is coherent and well controlled, without splattering, cobwebbing or the like.

In many applications a liquid adhesive is not deposited continuously as a bead of indefinite or long length. The adhesive is often laid down discontinuously, in bursts, to produce relatively short beads. Often this is done by a gun which is triggered while the substrate (e.g., a carton) is carried past the gun on a conveyor. The rate of triggering may be quite rapid, with actuation periods of as short as fractions of a second where the substrate is moving past the gun at a rate of 200–300 feet per minute. Such short, discontinuous actuation requires an apparatus and method that enables foamed adhesive to be delivered very rapidly upon triggering, with a sharp cutoff at the end of the desired period. In particular, foam should be delivered promptly after actuation without any significant initial period in which nonfoam-forming liquid adhesive is delivered, because as noted above the adhesive which does not foam does not have the same adhesive properties as the foamed liquid adhesive.

THE PRESENT INVENTION

In carrying out the method of the present invention, a coherent stream of viscous liquid containing dispersed gas that expands to form a foam after discharge is produced by pressurizing the liquid, as by pumping to pressure substantially above atmospheric and at least several hundred pounds pressure, and delivering it to an applicator having an enclosed internal chamber that is connected to a restricted outlet orifice. As gas under greater pressure than the liquid is introduced laterally through a passage that opens to the chamber, while the liquid is being passed through the chamber as an "integral" or continuous stream, that is, as a stream which is not "chopped" or segmented in the mixing region as a pump would segment it, nor dispersed as through a porous baffle. This forms an unstable dispersion or mixture of the gas in the liquid. Pressure is maintained on the mixture as it flows in a passage from the chamber to the orifice, but its pressure is not further increased by any mechanical means, i.e., the mixture is not subjected to further pumping once the gas and liquid have been delivered to the chamber in which they are mixed. The pressure is abruptly reduced by expelling the stream through the restricted discharge orifice to atmosphere. A stream of the gas/liquid mixture is thereby produced which generates a foam after discharge, as the gas expands in the liquid. Unlike a spray, this stream is "coherent," that is, it is not widely divergent or fan-like.

In the preferred practice of this method, the gas is introduced to the chamber through minute openings in substantially a right angular direction with respect to the direction of flow of the liquid. The gas flow rate, expressed as volume at standard pressure and temperature per unit time, should be in the approximate range of 1 to 50 times the volume flow rate of the liquid to produce a coherent foam stream without atomizing the mixture. (However, under the conditions actually existing in the chamber the liquid volume flow rate can exceed the gas flow rate, depending on gas pressure and temperature.) The liquid velocity is desirably relatively high to segment the gas stream as tiny "microbubbles" homogeneously dispersed in the liquid. The discharge orifice is preferably a tubular (cylindrical) restricted opening which has a length-to-diameter ratio that is less than 1, that is, its diameter exceeds its length. It is a very useful advantage that the outlet orifice can be immediately downstream of the chamber, with practically no intervening holding space.

The gas and liquid mixture formed by the technique is believed to contain only a small portion of the gas in true solution in the liquid. Ordinarily the major portion of the gas is not in true solution, but exists as tiny discrete microbubbles of gas that are unstably entrained in the flowing liquid.

The preferred liquid foam-producing apparatus in accordance with the invention includes a conduit connected in use to a substantially constant pressure source of the viscous liquid, for example a reservoir for melting hot melt adhesive, a pump and a pressure regulating valve. The conduit carries the liquid to an enclosed contacting chamber within a mixing head, through which chamber the liquid flows as an unbroken column or stream. A gas conduit is connected in use to an essentially constant pressure source of gas, for example a $CO_2$ or $N_2$ tank, with a pressure regulator. The gas conduit includes a flow restrictor which preferably is a capillary restrictor for establishing a very low gas flow rate. The restrictor is positioned closely adjacent to the contacting chamber, and interconnects with it through a minimal dead volume, via gas passages having minute openings to the chamber. The openings are positioned to be swept by the flowing liquid. The contacting chamber is connected to a short tubular restricted discharge orifice which can be just downstream from the chamber and which has a length-to-diameter ratio less than 1. While the gas/liquid mixture is flowing from the chamber of the outlet it is maintained under pressure high enough to prevent pre-expansion or frothing of the gas, prior to discharge.

In the most preferred form of the apparatus, the gas flow restrictor comprises a capillary bore restricted by an axially extending wire of diameter only slightly less than that of the bore, so as to define a narrow annular flow space around the wire in the bore. Downstream of this restrictor, the gas is injected into a cylindrical contact chamber through very small grooves which enter the chamber radially, at right angles to the direction of liquid flow.

A static mixer is preferably included between the contacting chamber and the discharge orifice, desirably of the type wherein the liquid stream is divided into separate streams and then recombined one or more times in order to improve dispersion, but in general this is not requisite.

In another aspect of the invention, the chamber in which the gas is contacted with the viscous liquid is positioned closely adjacent to the outlet orifice, and a valve for controlling the release to the outlet orifice of the mixture under pressure is disposed in a short passage that leads from the mixing chamber to the orifice. The valve preferably includes a movable element having an operating stem which passes through the center of the mixing chamber, so that the chamber is defined as an annular region in a bore around the stem of the valve element. As noted hereinafter, it has been found that such structure establishes very rapid response to valve actuation and precise definition of the outlet stream, particularly at cutoff with only negligible "tailing" after valve closure.

In a further aspect of the invention the apparatus is provided as a kit, mountable in place of the conventional tip of a hot melt adhesive gun, so that a presently existing gun can be modified to provide liquid adhesive in foam condition.

BRIEF DESCRIPTION OF DRAWINGS

The invention can best be further described and explained by reference to the accompanying drawings, in which:

FIGS. 1-7 illustrate apparatus in accordance with a first embodiment of the invention for use in foaming a hot melt adhesive, in which the gas flows continuously through the nozzle but the flow of liquid adhesive is valved;

More specifically, FIG. 1 is a side elevation of a hand-holdable hot melt liquid adhesive-dispensing gun to which the foam generating apparatus is mounted as an attachment;

FIG. 2 is an enlarged axial section, partly broken away, of the foam generating attachment of FIG. 1;

FIG. 3 is an axial view, still further enlarged, of the nozzle tip which presents the ultimate orifice;

FIG. 4 is a cross-sectional view taken on line 4—4 of FIG. 2, showing the minute openings through which the gas is brought into contact with the liquid adhesive stream;

FIG. 5 is a bottom plan view of a center hole plate element of the static mixing means;

FIG. 6 is a bottom plan view of a rim hole plate element of the mixing means; and FIG. 7 is an enlarged sectional view of the gas flow restrictor, taken on line 7—7 of FIG. 2.

FIGS. 8-10 illustrate a second embodiment of apparatus in accordance with the invention, in which two separate, simultaneously actuated valves control the flows of the liquid adhesive and the gas;

More specifically, FIG. 8 is a side elevation of a gun in accordance with the two-valve embodiment;

FIG. 9 is an enlarged partial axial section taken on line 9—9 of FIG. 8;

FIG. 10 is an axial section taken on line 10—10 of FIG. 9, particularly showing the gas valve.

FIG. 11 is an axial section, somewhat diagrammatic in nature, of a third and presently preferred embodiment of the apparatus, in which flow is valved after the gas has been dispersed in the liquid.

DETAILED DESCRIPTION

As already indicated, one advantageous feature of the present invention is that the apparatus is sufficiently small and light to be incorporated in a hand-held gun. This enables the gas to be dispersed into the liquid immediately before the mixture is discharged through the tip, which in turn simplifies the supply and eliminates need for foam return. In the first embodiment, illustrated in FIGS. 1-7, the mixing apparatus is shown in conjunction with a known type of gun for dispersing a hot melt liquid adhesive and having a trigger-operated valve for controlling the adhesive flow. In this embodiment the flow of gas (usually $CO_2$) is not valved; the gas flows continuously through the nozzle. When the trigger is operated to commence flow of the liquid adhesive through the gun, the gas is automatically mixed with it to produce the foam; and when the flow of liquid is shut off, the gas flow merely escapes to atmosphere through the nozzle, without adhesive.

In FIG. 1, a hot melt liquid adhesive gun shown in phantom is designated generally by 10. The particular gun shown for purposes of illustration is of known type, as shown in FIG. 4 of Scholl and Reighard U.S. Pat. No. 4,006,845, for "Molten Adhesive Dispensing Device" issued Feb. 8, 1977, and assigned to the same assignee as this application. The gun illustrated her may be the same as the gun numbered 10 in that patent, with changes and additions as hereinafter described. Reference may be had to that patent for a more complete description of the internal construction of the gun and the means for valving the flow of hot melt adhesive.

Gun 10 includes a hand grip portion 11 having a finger operated trigger 12 for operating the valve that controls flow of the liquid.

Liquid adhesive is supplied to the gun from a source or melter S, through a pressure regulator V (see FIG. 1) through a flexible hose or line 13, to a specially added foaming head attachment or "kit" indicated generally at 18. In this head 18 a gas is metered, contacted, and mixed into the liquid adhesive. The gas/liquid mixture is discharged from a nozzle tip indicated generally at 19. In the particular embodiment shown, the foaming head 18 is secured by a connector 25 threaded into a socket 20 of gun 10 formed at the end of a liquid feed conduit 14 thereof. This passage 14 corresponds to the discharge bore 22 illustrated in previously identified Scholl et al U.S. Pat. No. 4,006,845.

Referring principally to FIG. 2, the "kit" or attachment 18 includes a body 23 that is shaped to interfit with gun 10. This body 23 has an opening through it which is counterbored as at 24 to receive the head 21 of a connector 25. Connector 25 presents a liquid adhesive passage 26 which communicates with liquid feed conduit 14. Conduit 14 may be heated for maintaining hot melt in flowable condition, as described in the referenced patent.

Body 23 receives a generally conical nozzle extender designated generally at 27, which is threaded into counterbore 24. The nozzle extender 27 includes an axial passage 28 for carrying the gas/liquid mixture to the nozzle tip 19, through which it is discharged to ambient atmosphere.

Gas is supplied to the gun from a regulated pressure source comprising a pressure tank T and pressure regulator R, through flexible hose 32, to a restrictor 33 described below. The gas is brought into contact with the liquid in a contacting chamber 50, between connector 25 and nozzle extender 27.

Although the invention is not critically limited to a particular gas or liquid pressure, operative gas supply pressures for use with hot melts are usually in the range of 400 to 800 psi (as measured at R), with liquid supply pressures about 100 psi lower, in the range of 300 to 700 psi (as measured at V). At such pressures, the gas is so highly compressed that it occupies only a small fraction of the volume it would occupy at standard or ambient conditions (e.g., 14.7 psi and 68° F.). At the pressure conditions actually existing in the head, the actual volumetric gas flow rate is only a fraction of the liquid volumetric rate, even though the volumetric gas flow rate expressed at standard conditions of 14.7 psi and 68° F. is in fact several times the volumetric flow rate. In general, the gas rate is in the range of 1–50 times the liquid flow rate at standard conditions. It is to be noted that neither the gas nor the liquid pressure is increased by mechanical means once those components have been delivered to the gun or discharge head. (Pressure may increase because of generation of gas if a chemical reaction occurs between the gas and the liquid, but this is not necessary.)

To control the very small pressurized gas flow, a gas flow restrictor 33 is provided. A preferred form of restrictor 33 is shown in FIGS. 2 and 7, and comprises a "wire-in-tube" capillary restrictor. More specifically, gas from supply conduit 32 flows through an elongated tube 34 having an axial capillary bore 35. A wire 36, having a diameter slightly less than the diameter of the bore 35, e.g., 0.002 inch less, extends into or through the tube bore 35. The wire may have a hook or bent portion 37 at one end to facilitate its removal for cleaning. The tube 34 is sealed as by a braze 39 in a connector 40 which in turn is received in a threaded socket 41 in body 23. A gas flow passage 42 leads from socket 41, to counterbore 24.

This restrictor has been found effective to establish the extremely stable small gas flow rates needed. For a given tube and wire, the rate can be varied by changing the regulated inlet pressure at regulator R, length of the tube, or wire length in the tube.

By way of example, a restrictor tube 1.4 inches long with a bore diameter of 0.012 inch and a wire 1.0 inch long in the tube and of 0.010 inch diameter, will establish a gas flow of the order of 5.4 standard cubic feet per hour, at an inlet gas pressure of 600 psi, and a contact chamber pressure of 500 psi.

This capillary wire restrictor has been found to be far preferable to a short, small diameter flow restrictor. It is much less likely to plug and, while presenting a high forward impedance, it presents an even higher reverse impedance to flow of the viscous adhesive, so that a gas supply check valve is not needed.

It is desirable that the gas be dispersed into the liquid very closely downstream of restrictor 33; that is, the volume of capacitance between the outlet of restrictor 33 and the point of gas injection should be kept to a minimum, with the smallest feasible "dead volume." This has an important effect in reducing the "lag" between trigger operation and the delivery of foam from the tip 19. Structure which accomplishes this is shown in FIGS. 2 and 4. More specifically, a gas injection plate 49 is seated in counterbore 24, against connector head 21. Counterbore 24 is slightly oversize to provide a narrow annular flow path 48 around plate 49. The gas passage 42 inlets to this space 48. Plate 49 is generally circular and presents a gas liquid contacting chamber in the form of a cylindrical axial bore 50 that communicates with bore 26 of connector 25. The liquid adhesive flows as an integral stream or column through chamber 50, in an axial direction. Several gas introduction passages (eight, in the embodiment shown), preferably in the form of square bottomed grooves 54, extend radially from the periphery of the plate 49 to contacting chamber 50. These grooves 54 are very small in section, for example 0.006 inches square, and define minute gas injection openings where they intersect chamber 50. Opposite plate 49 these grooves 54 are closed by the flat surface of plate 58, against which plate 49 is seated. Preferably, the gas is injected into the liquid laterally, that is, in a direction that is generally perpendicular to the direction of flow of the liquid; and it can be seen that the passages 54 do provide such right angular lateral introduction of the gas to the liquid in chamber 50. Tests have demonstrated that a substantially better dispersion of the gas in the liquid adhesive is achieved by such uniformly distributed right angular gas injection, in comparison to a gas flow direction which is parallel to the liquid adhesive flow direction. It is believed that the liquid in chamber 50 flowing past the inner ends of grooves 54 chops or "segments" the gas flow so that the gas enters the liquid stream as tiny, discrete, spaced "microbubbles." The resulting mixture is an unstable dispersion; that is, the gas and liquid would separate if not discharged promptly.

Preferably a static mixing means, designated generally at 30, is included, seated in counterbore 24, between connector head 21 and the upstream end of nozzle extender 27.

A preferred form of the static mixer 30 comprises a stack of several baffle plates which provide divided and recombined flow paths for the gas/liquid mixture, between chamber 50 in plate 49 and nozzle extender passage 28. The stack of baffle plates preferably comprises alternating plates of two different types, as designated by 58 and 59 in FIGS. 6 and 5 respectively, and which are circular and of the same diameter as plate 49. Both types of plates 58 and 59 have raised peripheral rims 60 and 65 respectively, and recessed central portions 61 and 66 respectively. In the plates 58, a plurality of holes 62 are formed through recessed portion 61, just inwardly of the rim 60. A plate 59 is positioned against plate 49 immediately downstream of it, so that the liquid/gas mixture flowing through bore 50 of plate 49 and bore 67 of plate 59 impinges on plate 58 and then flows generally outwardly toward the holes 62. The flow divides among the holes 62, and these divided flows are recombined or directed radially inwardly in the recess 61 of the plate 58, to a central hole 67 of plate 59'. Below plate 59' (i.e., downstream, or toward the nozzle), the mixer stack preferably includes another plate 58'. A stack of four baffle plates of the type 58 and 59 has been found adequate for providing good mixing in practice. While this type of mixing means is especially preferred because it is axially compact and has a minimal volume, it should be understood that the invention is not limited to this particular type of mixing means and that other mixing means may be employed or, as described hereinafter in relation to FIG. 11, it can be omitted altogether.

As noted above, the gas if brought into contact with the liquid where grooves 54 in plate 49 meet bore 50. In addition, some gas "leakage" flow may also occur between all the facially abutting plates 49, 59, 58, 59' and 58' in the stack, and this gas will bleed from space 48 into the recessed centers 66 and 61 of the respective plates. Thus, it should be understood that the entire gas flow is not necessarily injected solely through grooves 54 but that in addition or alternatively gas may be admitted between the plates. However, it appears that finer foam and lower foam densities are obtained if the flow between the plates is prevented (as by better sealing), and by providing a plurality of elongated grooves as at 54, the outlet ends of which are swept by the moving column of liquid.

Because of the difficulty of observing the mixture flowing through the nozzle, the extent to which the admitted gas becomes truly dissolved in the liquid adhesive has not been established. It can be said that a homogeneous dispersion or mixture is formed in which the gas is finely distributed, as very small bubbles ("microbubbles"), with some gas truly dissolved. In most cases, formation of foam commences as the mixture exits from the nozzle, without a significant quiescent period before foam is observed in the stream or deposited bead. The rapidity tends to indicate that little gas is in true solution, since gas in solution generates foam more slowly.

The foam "blowing ratio", measured as a relative decrease in specific weight (decrease in density) compared to the unfoamed liquid, is a function of the amount of gas dispersed or dissolved in the liquid before discharge to atmosphere; it thus depends in part upon the efficacy of dispersion in chamber 50 and/or optional static mixing means 30.

Other significant factors which influence foam density are the actual gas-to-liquid flow ratios in chamber 50 and the actual gas pressures and fluid velocities at which mixing is accomplished. These in turn depend upon initial gas supply pressure, adhesive supply pressure, gas restrictor sizing, discharge nozzle sizing and various other fixed and variable pressure drops throughout the system. Foam density decreases, compared to the unfoamed liquid, as relatively more gas is admitted to chamber 50 by adjustment or permanent alteration of one or more of these factors. In actual practice, a wide range of adjustment of these variables is desirable to produce different foam densities and to accommodate differing deposition rates, temperatures and base material requirements.

Practical and useful gas-to-liquid volume (standard conditions) flow ratios appear to vary, from about 1:1 to about 50:1; liquid flow rates vary up to 60 pounds per hour or higher, and adhesive foam density reduction ratios may vary from 2:1 to 4:1, depending on the application.

A preferred method of adjusting gas-to-liquid flow ratio is by independent adjustment of gas and liquid supply pressures, using the two fluid pressure regulators R and V provided in the system (FIGS. 1 and 8). Gas pressure is typically adjusted to be about 100 psi above the pressure in chamber 50, to allow for regulator drift and lack of regulator stability due to changing temperature and flow. This 100 psi nominal operating pressure differential and the dimensions of fixed gas flow restrictor 33 control the volume flow of gas relative to the liquid.

It is of significance to note that the gas-to-liquid flow ratios cited can provide significantly more gas to the mix than would be inferred from the foam densities obtained. It is believed that this excess gas is freely discharged to the atmosphere as the foam stream exits the nozzle. The orifice 70 accommodates the discharge of this excess gas, plus the main fluid stream, in a smooth and continuous manner, without mainstream disruption or divergence. The foam does not and should not form at all in the nozzle, because this would be accompanied by spitting, coughing, and irregular output.

As noted above, it is not requisite to include additional mixing means to further disperse the gas bubbles after the gas stream has been segmented by the flowing liquid. Such mixing means may be omitted and the gas injected, as via the gas inlet plate 49, without further mixing. For a given viscous liquid, specific temperature, pressure and flow rate conditions can generally be identified at which mixing is achieved in absence of any plates 58 and 59. These conditions can be determined by routine experimentation, for a given material, by varying pressure, temperature, and flow rate.

Downstream of the gas inlet plate 49, and static mixing means 30 if present, the gas/liquid adhesive mixture flows through flow passage 28 in nozzle extender 27. In this region, that is, between the point of gas injection in chamber 50 and the discharge orifice, sufficient pressure should be maintained to prevent pre-expansion of the foam in the gun. The passage 28 leads to nozzle tip 19 which is threaded into the end of the passage 28. As shown in detail in FIG. 3, nozzle 19 presents what may be called the ultimate or discharge orifice, that is, the final and preferably the smallest restrictor 70 through which the liquid adhesive/gas mixture passes as it is discharged to atmospheric pressure. Upstream, a larger diameter tip passage 72 connects passage 28 to orifice 70, joining the latter at conical transition 71.

We have found that the geometry of the tubular portion of the orifice, as expressed by the ratio of its length measured in the axial direction, to its diameter, is highly important in the production of the most coherent, steady output stream. Preferably tube 70 should be short, with an L/D ratio less than 1.0 and most preferably in the range of 0.1 to 0.9; i.e., its diameter should exceed its length. (With reference to FIG. 3, note that this refers only to the final or most restrictive orifice, from which the adhesive/gas mixture is discharged directly to the atmosphere. This does not refer to or include the conical entrance transition 71 to the orifice, or the feed passage 72 upstream of the entrance, both of which are larger than ultimate orifice 70.) Further, the orifice preferably has a small flat on the tip, making an angle of 90° with bore 70. Conical transition 71 is preferably a 90° included angle for best performance.

Previously it has been the general practice to use relatively long, tubular discharge orifices for hot melt adhesive application. Contrarily, we have found that with liquid adhesives and gas mixtures, use of a long nozzle having an L/D ratio above 1.0 tends to result in premature expansion of the gas, before it has been discharged. This is manifested as undesirable spitting, "belching" or divergence of the foam stream. A short orifice, on the other hand, will discharge a generally smooth, well focused, nondivergent stream of liquid adhesive foam with insignificant spitting.

By way of example, one discharge orifice which has been tested and found useful has an 0.0175 inch tube diameter (D in FIG. 3) and an 0.0125 tube length (L in FIG. 3), corresponding to an L/D ratio of 0.72. This orifice was used to dispense a commercially available polyethylene base hot melt adhesive with $CO_2$ as the gas blowing agent. The liquid adhesive flow was about one-quarter cubic foot per hour, with a regulated gas supply rate of 2-6 standard cubic feet per hour, for an approximate range of 8:1 to 24:1 in the gas/liquid flow ratio. The gas was at an initial pressure (as measured upstream of the restrictor 33) of about 600 psi. A steady coherent output stream was produced, which after deposition on a substrate was observed to be a uniform foam bead, semi-circular in shape and about 0.25 inch wide. (At excessively high gas pressure, the gas tends to atomize the liquid, rather than to extrude it as a coherent stream.) The specific weight of the foam, measured after cooling, was 17.6 to 29.3 pounds per cubic foot; the unfoamed adhesive had a specific weight of 58.7 pounds per cubic foot. This corresponds to a density reduction of about 2.0-3.3, and is attributable to the introduction of the $CO_2$ gas bubbles in the melt by the apparatus.

In the operation of the embodiment illustrated in FIGS. 1-7, the flow of gas through wire-in-tube restrictor 33 and outlet orifice 70 is continuous; that is, gas flow is not valved by trigger 12. In that embodiment, gas flows from the gas inlet plate 49 and is emitted from the orifice, regardless of whether liquid adhesive is triggered to flow in passage 14. The continuing gas flow after liquid shut-off is so small that little gas is lost, but it may cause filament-like strands ("cobwebs") of residual liquid adhesive to form at the orifice, which may be objectionable in some cases where triggering is frequent.

The double valved embodiment of FIGS. 8-10 provides a valved gas flow as well as a valved liquid adhesive flow. This embodiment may be used in conjunction with a gun similar to that already described but modified so that the trigger which valves the flow of liquid adhesive simultaneously operates a valve that controls the gas flow. The gun 10' shown in phantom in FIG. 8 corresponds to the gun 10 previously described in relation to the first embodiment, but with modification as described below. In place of the previous trigger 12 the gun 10' presents a lever-shaped trigger 75 having an elongated arm 76 and a right angled head or bar 77 extending transversely from arm 76. The edge of bar 77 forms a pivot 78 and is seated for pivoting movement against a shoulder 79 presented by the gun body. When arm 76 is moved upwardly from the "closed" position shown in FIG. 10, bar 77 pivots at 78 against shoulder 79 and in this pivoting movement the face of bar 77 swings away from the valve body face 80. This movement is used to operate two separate valve means 81 and 82, the valve 81 controlling the flow of liquid adhesive and the valve 82 controlling the flow of gas. Valve 81 may be similar to the valve mechanism 34 in Patent No. 4,006,845; that is, it may be of the same valve structure as used in the first (single valve) embodiment hereof.

The liquid adhesive is supplied through valve 81 to the nozzle through a connector 25, a gas inlet plate 49, mixing means 30, a nozzle extension 27 and a tip 19, all as previously described. Gas is supplied to gas inlet plate 49 from a source of gas under pressure through a wire-in-tube type restrictor 33', the flow of gas to which is valved at its upstream or inlet end 85 by the gas valve 82. The tube 34' of the restrictor 33' is sealed in a bore in a body block 87 mounted as an attachment to gun 10'. A short transverse bore 88 leads from the downstream end of restrictor 33' to a space 48 in which gas inlet plate 49 is seated. The ends of bore 88 and the tube bore in body 87 are closed by removable plugs or screws 89, 89 for installation, access and cleaning.

The gas valve mechanism 82 is of the poppet type, and includes an elastomeric seat 93 which is retained as by crimping on an elongated valve stem 94. A spring 95 biases seat 93 against the inlet end 85 of gas flow restrictor 33'. Stem extension shank 96 is mounted for movement relative to the body, passing through an aperture 97 in lever head or bar 77 and carrying a nut 98 which permits adjustment of the degree of trigger movement needed to effect valve operation. As can be seen from FIGS. 9 and 10, movement of lever arm 76 into or out of the plane of the sheet draws nut 98 away from body 87 and thereby moves seal 93 away from the inlet end 85 of restrictor 33'. Gas from a supply conduit 99 (FIG. 10) can then flow through a bore 100 into the valve chamber 101, from which it flows into the inlet of restrictor 33' when the valve is open. In this connection, appropriate slots or gas passages, as designated at 102, are provided in valve element 94 so the gas can flow from chamber 101 into the inlet of the restrictor 33'.

By adjustment of nut 98, the valves 81 and 82 can be set to operate simultaneously or in a desired one-two sequence, so that gas flow is started and stopped in timed or simultaneous relation to flow of liquid adhesive.

In the two embodiments described above the flows of the gas and liquid adhesive streams are valved before (upstream of) their entry into the contact chamber wherein the gas is dispersed in the liquid adhesive. Figure 11 illustrates a third embodiment, differing from the first two embodiments in that the combined gas/liquid flow is valved at a point downstream of the contact chamber, beyond the point of gas introduction to the liquid. This embodiment provides improved results in terms of reduced time delay between trigger operation and delivery of a foaming output stream. Moreover, this embodiment minimizes the volume of unfoamed adhesive trapped downstream of the shut-off and thereby provides a very crisp cut-off without a significant "tail" of discharge material after cut-off. It should also be noted that this embodiment includes no separate mixing means such as the baffle plate stack 30 of the other embodiments. This embodiment is the presently preferred embodiment of the apparatus.

More specifically, in FIG. 11 there is shown a foam mixing head generally at 110 that includes a body 111 having an axial cavity or bore 112. A liquid adhesive conduit 113 enters cavity 112 through body 111, for delivering a liquid adhesive at a regulated pressure from a source not shown, through a check valve 114.

Adjacent cavity 112, body 111 is counterbored as at 120, and an air introduction plate 121, which may be generally similar to the plate 49 previously described in relation to FIG. 4, is seated and secured in the counterbore 120, within a shoulder 131 therein. Plate 121 presents a bore 122 which is in constant communication with the liquid adhesive in cavity 112, and it is also provided with a multiplicity of narrow elongated air delivery grooves 125 on its lower face, which intersects contact chamber 122. The grooves may be similar to the grooves 54 described in relation to FIG. 4, suitably about 0.006 × 0.006 inch. These grooves 125 communicate through narrow annular space 124 around plate 121 through a gas conduit 126 to a gas flow restrictor shown diagrammatically at 127 which may be similar to the tube-in-wire restrictor 33 previously described. For best results the total volume of "capacitance" between the outlet of the restrictor and the contact chamber 122 should be as small as is feasible in practice.

A nozzle extender 130 is secured and sealed in body 111 to bear against plate 121 and clamp the latter against the body 111. Nozzle 130 presents a short (for example, 1.1 inch long) axial passage 136 having a tapered or conical valve seat 137 just downstream of bore 122 of plate 121. A tip 140 having a short, restricted orifice 141 is secured at the outer end of passage 136. This orifice has an L/D ratio less than 1.

The valve means designated generally at 150 is mounted for axial movement relative to body 111, to form a valve with the seat 137. More specifically, valve means 150 includes a movable valve element having an elongated stem 151 which is sealingly slidable within a collar or insert 152 in body 111. At its downstream end, stem 151 is provided with a valve surface 153 which has a taper to form a seal with seat 137. A spring 154 in cavity 112 bears against a shoulder 165 on the valve stem 151 and thus tends to bias the valve 137, 153 closed. The shoulder 165 has flats 166 formed thereon to provide liquid flow passages between the shoulder 165 and the bore 112 of body 111.

The edges 167 of shoulder 165 are in sliding engagement with the bore 112 and function as a centering means to maintain the valve 153 centrally positioned within bore 122. At its opposite end (the upper end, in FIG. 11) stem 151 mounts a collar 158 which is engaged for trigger-operation, for example as by structure shown in U.S. Pat. No. 4,006,845, as previously discussed.

In contrast to prior devices, it will be noted that this valve is positioned downstream, rather than upstream, of the chamber in which the gas and liquid are contacted, and that it is closely adjacent the discharge orifice.

In the operation of the FIG. 11 embodiment, the gas is introduced to liquid adhesive in chamber 122, upstream of valve seat 137. Check valve 114 prevents the higher pressure gas from expelling liquid backwardly through conduit 113 when the movable valve element 153 is seated. When the valve is unseated, the liquid flows through chamber 122 as an annular column around valve stem 151, and this provides a strong shearing action for dispersing the gas microbubbles. When the valve is closed, the volume of fluid downstream of the valve but upstream of the orifice 141 is relatively small in comparison to the first embodiments. When triggered, only a small volume of residual fluid must first be displaced, so that foam is ejected almost immediately upon triggering. When the valve is closed, the volume of fluid between the valve and the orifice is so small that its pressure is quickly dissipated, and it does not exude from the orifice to form a tail.

Further referring to FIG. 11, the liquid/gas mixture is extruded from the orifice 141 as a relatively narrow (or "well focused") coherent, steady stream of material 160. Foam begins to form quickly as it leaves the orifice. When the stream 160 is deposited on a substrate, as indicated at 161, which is moving relative to the nozzle in the direction of the arrow, it forms a continuous well defined bead of foam liquid adhesive as at 162.

From the description and examples given above, those skilled in the art will understand that the invention includes other embodiments within the scope of the following claims.

We claim:

1. A method of foaming a viscous liquid which comprises:

separately pressurizing the liquid and a gas to at least several hundred pounds pressure and delivering them through separate passages to an applicator having an internal chamber which is connected to a restricted outlet orifice close to the chamber, introducing the gas into said liquid through minute passage means opening to said chamber, passing the liquid through said chamber as an integral stream which flows past the opening of said passage means to said chamber, so that the liquid stream segments the incoming gas to form a mixture of gas bubbles in the liquid, maintaining the gas and liquid mixture under pressure but without further increasing the pressure of the mixture while it flows from said chamber to said orifice, and suddenly reducing the pressure of the gas and liquid mixture by releasing it to atmosphere through said restricted orifice, the mixture being released as a stream which is coherent in passage to a substrate, whereby a foam will be produced one said substrate.

2. The method of claim 1 wherein the pressure under which the gas and liquid mixture is maintained while it flows from said chamber to said orifice is sufficiently high to prevent pre-expansion of said bubbles upstream of said outlet orifice.

3. The method of claim 1 wherein said mixture is discharged through a restricted orifice which is in the form of a tubular opening having a length to diameter ratio less than 1.

4. The method of claim 1 wherein said liquid passes through said chamber as an annular column.

5. The method of claim 1 wherein said gas is introduced to said chamber through passages having minute openings thereto, the gas flow being segmented by the flow of said liquid past said minute openings.

6. The method of claim 1 wherein said gas is introduced to said chamber in a direction at a right angle to the direction of flow of said liquid.

7. The method of claim 1 wherein said mixture is further mixed between said chamber and said orifice by passing it through paths which divide and recombine said mixture.

8. The method of claim 1 wherein said liquid is pressurized to a pressure of about 300 to about 700 psi.

9. The method of claim 1 wherein said gas is introduced to said chamber at a pressure about 100 psi greater than the pressure of said liquid.

10. The method of claim 1 wherein the volumetric gas flow rate, expressed at standard conditions, is in the range of about 1 to 50 times the volumetric flow rate of the liquid, but at actual conditions is only a fraction of the liquid flow rate.

11. A method of producing a coherent output stream of liquid adhesive containing a dispersed gas which after discharge will expand to form a foam, comprising, pumping the liquid adhesive, under several hundred pounds pressure, as an integral stream into a chamber, separately introducing a gas into said chamber at a pressure greater than said adhesive, through passages having minute openings to said chamber that are swept by the stream of the pressurized adhesive, the flow of liquid across said openings segmenting the gas entering therefrom as microbubbles entrained in the stream, thereby forming an unstable gas/liquid mixture, conveying the mixture to a discharge orifice which is adjacent the chamber, without further pressure increase but while maintaining sufficient pressure on the mixing so formed to prevent pre-expansion of said gas during such conveying, and abruptly reducing the pressure by expelling the mixture to atmosphere through a restricted discharge orifice, the mixture exiting the discharge orifice as a stream in which said microbubbles then expand to form a foam.

12. The method of claim 11 wherein the gas is supplied to said chamber at a volumetric flow rate which, expressed at standard conditions, is in the range of about 1–50 times the volumetric flow rate of the adhesive but wherein the volumetric gas flow rate at actual conditions is only a fraction of the adhesive flow rate.

13. The method of claim 11 wherein said liquid adhesive is supplied at a pressure in the range of 300 to 700 psi.

14. The method of claim 11 wherein said gas is introduced to said chamber in a direction that is substantially at right angles to the direction of flow of the liquid adhesive through said chamber.

15. The method of claim 11 wherein the gas flow is restricted by passing the gas through an annular space defined by an axial wire in a capillary tube.

16. The method of claim 11 wherein said restricted orifice has a length to diameter ratio less than about 1.

17. A method of foaming a viscous liquid which comprises:

supplying a viscous liquid to a chamber of an applicator at a first pressure which is substantially above atmospheric pressure, causing said liquid to flow through the chamber as an integral stream, supplying a gas to said chamber at a second pressure which is above the first pressure, delivering the gas into the integral stream of the liquid, the movement of the liquid stream through the chamber segmenting said gas into microbubbles in the liquid, further dispersing said microbubbles in the liquid by providing static mixing in a tortuous flow path, delivering the dispersion of the microbubbles in the liquid from said chamber to a restricted outlet orifice which is close to and in communication with the chamber, said delivery to the orifice being effected without mechanically increasing the pressure of the dispersion, and releasing the dispersion to the outside of said applicator from said chamber through said restricted orifice as a stream which is coherent in passage to a substrate, whereby a foam will be produced on said substrate.

18. Apparatus for foaming a viscous liquid which comprises means for pressurizing the liquid to several hundred pounds pressure and delivering it under pressure to an applicator having an internal chamber wherein it is mixed with gas, said chamber presenting an internal flow space for the flow of said liquid therethrough as a continuous stream, passage means for introducing the gas under pressure into said liquid in said chamber through minute transverse openings to said chamber past which the liquid flows as a continuous stream, to form an unstable mixture of the gas and the liquid, means for maintaining the gas and liquid mixture under pressure but without further pressure increase while it is conducted from said chamber to an orifice, and said orifice being a restricted outlet orifice close to the chamber for dispensing the gas and liquid mixture to atmosphere as a coherent stream.

19. The apparatus of claim 18 wherein said restricted orifice is in the form of a tubular opening having a length to diameter ratio less than 1.

20. The apparatus of claim 18 wherein said restricted orifice is in the form of a tubular opening having a length to diameter ratio in the range of about 0.1 to 0.9.

21. The apparatus of claim 18 wherein said chamber defines an annular flow space through which said liquid passes, said transverse openings entering to said annular flow space.

22. The apparatus of claim 18 wherein said passage means opens to said chamber in a direction at a right angle to the direction of flow of said liquid in said chamber.

23. The apparatus of claim 18 including mixing means presenting flow paths which divide and recombine said mixture downstream of said chamber, said mixing means disposed between said chamber and said orifice.

24. Apparatus for foaming a viscous liquid which comprises means for pressurizing the liquid to several hundred pounds pressure and delivering it under pressure to an applicator having an internal chamber wherein it is mixed with gas, said chamber presenting an internal flow space for the flow of said liquid therethrough as a continuous stream, pressure means for introducing the gas under pressure into said liquid in said chamber through minute transverse openings to said chamber past which the liquid flows as a continuous stream, to form an unstable mixture of the gas and the liquid, means for maintaining the gas and liquid mixture under pressure but without further pressure increase while it is conducted from said chamber to an orifice, said orifice being a restricted outlet orifice close to the chamber, for dispensing the gas and liquid mixture to atmosphere as a coherent stream, and a flow restrictor which is adjacent said openings to said chamber, said restrictor comprising a capillary tube having an axial bore and a wire extending into said bore, an annular flow space being defined around said wire in said bore.

25. A system for producing a coherent output stream of liquid adhesive containing a dispersed gas which will expand to form a foam bead, comprising a source of liquid adhesive under several hundred pounds pressure, a liquid conduit connected to said source, a contacting chamber communicating with said liquid conduit for flow of said liquid adhesive therethrough, a source of gas under pressure greater than the liquid pressure, a gas conduit connected to said gas source, said gas conduit including a gas flow restrictor, said flow restrictor positioned closely adjacent said chamber and communicating with it through minute gas injection openings across which the liquid adhesive stream flows, and passage means leading from said chamber directly to an adjacent discharge orifice, said discharge orifice being a short, restricted orifice having a length to diameter ratio which is less than 1.

26. An attachment mountable to a hot melt adhesive dispenser to adapt it for producing a coherent output stream of hot melt adhesive containing a dispersed gas which will expand to form a foam, said dispenser being of the type including a body, a delivery passage through which said adhesive is delivered under high pressure, and a valve for controlling delivery of said adhesive through said delivery passage, said attachment comprising, a head mountable to said body for dispersing a gas in said adhesive in the head, a contacting chamber communicating with said delivery passage and through which said adhesive flows as an integral stream, a gas conduit for connection to a source of gas under pressure, said conduit including a gas flow restrictor, said flow restrictor positioned adjacent said chamber and communicating with it through minute laterally disposed gas injection openings across which the adhesive stream flows in a generally axial direction, and passage means leading from said chamber directly to a discharge orifice close to said chamber, said discharge orifice being a restricted orifice having a length to diameter ratio which is less than 1.

27. The attachment of claim 26 wherein said flow restrictor is effective to restrict the flow of said gas under pressure to a volumetric rate which, expressed at standard conditions, is in the range of about 1 to 50 times the volumetric rate of flow of the adhesive.

28. The attachment of claim 26 wherein said chamber defines an annular flow space through which said adhesive passes.

29. The attachment of claim 26 wherein said minute openings direct said gas into said chamber in a direction at right angles to the direction of flow of said adhesive in said chamber.

30. An attachment mountable to a hot melt adhesive dispenser to adapt it for producing a coherent output stream of hot melt adhesive containing a dispersed gas which will expand to form a foam, said dispenser being of the type including a body, a delivery passage through which said adhesive is delivered under high pressure, and a valve for controlling delivery of said adhesive through said delivery passage, said attachment comprising, a head mountable to said body for dispersing a gas in said adhesive in the head, a contacting chamber communicating with said delivery passage and through which said adhesive flows as an integral stream, a gas conduit for connection to a source of gas under pressure, said conduit including a gas flow restrictor, said flow restrictor positioned adjacent said chamber and communicating with it through minute laterally disposed gas injection openings across which the adhesive stream flows in a generally axial direction, said flow restrictor comprising a capillary tube having an axial bore and a wire extending into said bore, an annular flow space being defined around said wire in said bore, and passage means leading from said chamber directly to a discharge orifice close to said chamber, said discharge orifice being a restricted orifice having a length to diameter ratio which is less than 1.

* * * * *